United States Patent
Manley

(10) Patent No.: US 11,307,283 B2
(45) Date of Patent: Apr. 19, 2022

(54) SMART TRACK A SYSTEM FOR TRACKING AND/OR CONTROLLING CHANGE OF LOCATION BASED EVENTS

(71) Applicant: William Manley, Cordova, TN (US)

(72) Inventor: William Manley, Cordova, TN (US)

( * ) Notice: Subject to any disclaimer, the term of this patent is extended or adjusted under 35 U.S.C. 154(b) by 82 days.

(21) Appl. No.: 16/401,711

(22) Filed: May 2, 2019

(65) Prior Publication Data
US 2020/0348386 A1 Nov. 5, 2020

(51) Int. Cl.
| | | |
|---|---|---|
| G06K 9/62 | (2006.01) | |
| G01S 3/786 | (2006.01) | |
| G06N 5/02 | (2006.01) | |
| G01S 3/781 | (2006.01) | |

(52) U.S. Cl.
CPC .............. *G01S 3/786* (2013.01); *G01S 3/781* (2013.01); *G06K 9/6217* (2013.01); *G06N 5/025* (2013.01)

(58) Field of Classification Search
CPC ....... G01S 3/786; G01S 3/781; G06K 9/6217; G06N 5/025
See application file for complete search history.

(56) References Cited

U.S. PATENT DOCUMENTS

| | | | | |
|---|---|---|---|---|
| 9,839,809 B2* | 12/2017 | Wohl | ...................... | H04B 1/719 |
| 2009/0231198 A1* | 9/2009 | Walsh | ..................... | A63B 71/06 |
| | | | | 342/463 |
| 2012/0115557 A1* | 5/2012 | Kia | ........................ | H04W 4/80 |
| | | | | 463/6 |
| 2015/0131845 A1* | 5/2015 | Forouhar | ................ | G06F 16/71 |
| | | | | 382/100 |
| 2015/0310280 A1* | 10/2015 | Bentley | .............. | G06K 9/00711 |
| | | | | 382/103 |
| 2016/0029158 A1* | 1/2016 | Hansen | ................... | H04W 4/80 |
| | | | | 455/456.1 |
| 2016/0125234 A1* | 5/2016 | Ota | ....................... | G06K 9/6267 |
| | | | | 382/103 |

\* cited by examiner

*Primary Examiner* — Emily C Terrell
*Assistant Examiner* — Molly Delaney
(74) *Attorney, Agent, or Firm* — Charles F. Rye

(57) ABSTRACT

The subject invention is a system of apparatus interconnected by communication with a computer system. The primary detect transceiver detects entities involved in a change of location event. The detection data is analyzed to provide current location of entities. That data may also be analyzed to create/confirm a digital identity of each entity. The current location is compared their prior location in relation to a designated event area and outputting a location and vector. Identity, location and vector are compared to a rule data set to determine whether the event should proceed under normal rules or modified rules. The output of the computer system includes a representation of the event region, event area, entities and current event operation condition to a human perceivable interface which may also accept commands altering the output. That output is further transmitted to event enunciators which in turn signal to the event entities whether to proceed under normal or modified rules.

10 Claims, No Drawings

SMART TRACK A SYSTEM FOR TRACKING AND/OR CONTROLLING CHANGE OF LOCATION BASED EVENTS

BACKGROUND OF THE INVENTION

The invention relates to a perception of identity, location and vector of entities and signal system for change of location based events.

The applicant suggest, without limitation, that the invention could be classified as: A63F 13/795.

DISCUSSION

The invention relates to a perception and signal system for events based on movement of event entities. The operations of such events are most often defined by a rule set. The term "control" is also used in the context of providing signals, enunciation, to event entities indicating a change in the operating rules. By way of example only and nota limitation, a caution indicator would enunciate a rule is invoked requiring event entities to operate at a slower speed, not pass, etc. In racing a caution is often represented as a yellow flag or light visual indicator. The present invention also relates to events where time is a lesser consideration to precision of movements made by the event entities. In some embodiments the present invention may also provide information to other entities as to the general operation of the event.

Algorithms, programs, are now complex enough and hardware speed is fast enough to replace some human judgment and easily faster. However, even in the very complex operations such as some modern aircraft, electronically controlled systems still provide for human inputs to confirm or modify what the "machine" has decided should be done. Perception data analyzed by computer programs resulting in commands sent out to systems has grown exponentially from simple position detector switches to machine vision and now progressing into machine learning.

Computer based systems can be very useful even in far more mundane endeavors such as controlling and scoring competitive events such as racing. Perceiving competitors location and whether their position and vector indicates the competition is proceeding normally is of paramount importance.

A raised platform for observers and signal flags was probably the first step followed by radio communications and visual transmission and lighted signals for invoking rules that are intended to modify the participants' behavior. Placing a signal where a competitor's attention is focused is necessary to ensure the competitor has received the signal. Waving a flag on one side of a track when virtually every competitor would be focused elsewhere is ineffective. There is also the issue of different classes of entities operating during the same event.

BRIEF SUMMARY OF THE INVENTION

The current invention is based on perceiving the location and vector of entities involved in a change of location based event. The perception data is compared to data representing the area the event should occur and a data set representing rules of event operation. The output of that analysis is utilized to signal to event entities whether to proceed under normal or modified event rules.

BRIEF DESCRIPTION OF THE SEVERAL VIEWS OF THE DRAWING

The applicant avers that drawings are not necessary to the understand subject matter of the invention by those skilled in the art.

DETAILED DESCRIPTION OF THE INVENTION

Most change of location based events, which includes almost all forms of racing, operate within a designated region and generally may be further confined to a designated event area upon the designated region. The event area will normally be defined by a plurality of event area boundary defining features. The event entities will have visual identifying indicia based on emitting or reflecting tracking electromagnetic radiation which may include the non-visual spectrum. Such contests are defined by an event rules set.

In order to assist event operators or outright automate such an event requires at least one primary detect transceiver. In its early primitive form human perception was transmitted by signal flag; then radio communications; and later further enhanced by video feeds. The current invention utilizes at least one primary detect transceiver. The detect circuit of the primary detect transceiver is sensitive to at least one predetermined bandwidth of tracking electromagnetic radiation being emitted and or reflected from the entity including visible light and/or the non-visual spectrum. The output from the detect circuit would be digitized and transmitted to a computer system. With the advancement of machine vision the output from the detect circuit may be digitally interpreted to identify event entities. The interpretation of such data would be conducted by the computer system which may be remote requiring communication. In order for the information created by the computer system to be usable to event entities, the output of the data analysis is converted to signals which the event entities would be able to perceive. This would require at least one event condition enunciator in communication with the computing system. The event condition enunciator would have the means to create a signal to the event entities which may include: visual including, lights, flags or placards being extended; and/or aural signals. The event condition enunciator would be enabled to signal at least two event condition signals being at least normal and modified. The rules may include a failsafe mode that if no signal is present the event shall proceed in at least a caution mode.

In order for the position and change in position of the entities to be relevant the computing system has a data set one representation of the designated region and a data set two representation of the event area including the location of the event area boundary defining features. The computing system also has data set three representation of the event operating rules having at least two states being normal event operation and modified event operation. The computer system receives real time data from the primary detect transceiver(s) which it accumulates in sequential frames of date in data set five, comparable to single images from a motion picture. (Data set four reserved for later use.) The frames of data are analyzed by the computer system by an event control data transformer which compares current and previously real time position data of event entities with reference to the region and area and rule set. The output of the event control data transformer creates and stores data set six also in data frame format. Data set six is a digital representation of the event area superimposed on the designated region further showing the event boundary defining features along with event entity(s) position and at least one event entity's vector and a representation of whether the event is operating under normal or modified event rules. The status of the event is transmitted to the event condition enunciator(s) which in turn generates a signal indicating the event condition state which in turn indicates whether the entities should proceed under normal or modified rules.

Most change of position events now utilize human judgment to control the event. The system being claimed may also utilize at least one data interface being in communication with the computer system receiving data set six producing human perceivable output and receiving inputs. Such inputs would be stored in data set four representing sequential storage of any commands sent to the computing system. Such commands may include: belay or confirm changing event condition status, confirmation of modified rules, and adjustment of sensitivity to perception to initiate modification of event rules or return to normal rules.

In order to facilitate identification of event entity(s) each would be assigned specific identifying means which may include, but not limited to, characters or symbols displayed on the event entity, electromagnetic emitters, or RFID tags separately identifiable by the computing system and the computing system accepting commands creating or correcting event entity(s) identification.

The system may include a unique to each event entity ID tags displayed on each the event entity being visually perceivable reflective refractive indicia being machine readable. The primary detect transceiver having at least one circuit sensitive to visual light, and the computer system having a machine reading circuit converting visual signals of the ID tags to data representing each the event entity and their location. The computing system would then convert the image of the entity and the ID tag to an icon representing each the entity(s) outputted in data set six.

The system may include RFID tags being passive or self-powered with at least one programmable circuit which emits an output signal bearing digital data upon being interrogated by an interrogation signal. The RFID tag circuit is programmed to emit a unique to each the event entity identifier. The system would also include a transceiver having a circuit producing an interrogation signal companionate with the RFID tags and further transmitting the identification data to the computing system.

The system may include at leas one secondary transceiver having locating and identifying means attached to each event entity to determine the entity's position(s). That means may include but not limited to, local-too-the-region beacon transmitter(s), GPS receiver or other publically accessible positioning system. Each the secondary transceiver having a receiver circuit companionate to the locating means. Each the secondary transceiver emitting a unique identifier and at least the entity's positional data and may include its vector to the computing system in communication with the computing system either directly or via the primary transceiver. The secondary transceivers having a means to emit event condition signals, may include, but not limited to: visual, aural or tactile signal generators; electromagnetic signals or a data stream.

The system may include having two or more event entity(s). The rule set, data set three, including rules specific to at least two classes of event entities and the event entities divided into at least two companionable classes. At least one individually addressable secondary transceiver attached to each event entity. The computing system also having within data set three representation of expected performance of each class of event entity's, and the event control data transformer producing current conditions data set six including individualized current conditions data. That output including individualized secondary transceiver event operation commands sent to the individual secondary transceivers. By way of example and not limitation a class of entities having a speed limit imposed on certain parts of the event areas or must move over on the even area to yield to passing by a higher class of entity.

The system may include relatively fixed position event condition enhanced enunciators, having a signaling means. The event condition enhanced enunciators imbedded in at least one the event area boundary defining feature(s) which may include movable barrier impact energy absorbing structures.

The system may include relatively fixed position event condition enhanced enunciators having signaling means being imbedded in the designated event area. That means may include wavy tubes held in lumens imbedded in the surface which would be extended and retracted by applying air pressure or extendable/retractable placards.

The system may include the event area being divided into at least two lanes being spaced across the width of the event area. The event area being further divided into at least two zones being the width of the event area and extending for a predetermined distance encompassing a distinctly different area of the event area, lanes and zones being represented in the data set two. At least two event condition enunciators or enhanced enunciators enabled to emit at least two event condition signals for each lane. The event rules including rules represented in data set three for conditions which invoke modified rules for particular lanes, zones or combined areas of lane and zone. The computing system outputting signals communicated to the event enunciators activating event condition signals being at least normal or modified for each the lane and/or zone and the computer system also outputting data set six lane and/or zone specific event condition indicators.

The system may include event entities being mechanically operated event entities having an electronic control system and each having a secondary transceiver in communication with its electronic control system. Event condition signals via the secondary transceiver would alter the function(s) of the electronic control system to conform to the event operation rules.

In order to improve the usefulness of the collected data the system may include the event data transformer being enabled to compare individual event entities, selected group or class performance data from the data set six against other event entities, selected group or class performance data and output that comparison as data set seven, and further enabled to similarly compare historic data and from other event areas. The feedback of actual event data is valuable for training and confirmation of ability for event entities. The ability to compare data from other event areas may also predict an entities performance on an entirely new event area or lead to event area design modification.

The system may further include enablement of the event entities being digital remote event entities in communication with the computer system whose participation in the event is by way of their representation on the event region and the digital remote entities receiving output from data set six. The system may also be further enhanced by allowing digital remote event entities to participate by being inserted into a playback of historic data of a real event or a real event in which one or more actual event entities may be removed. In yet another embodiment the system would provide for a mix of digital and physical event entities operating on the same area by providing a virtual image of a digital entity by way of a heads-up imaging system.

Supercross is a motorcycle based event featuring aerial launches of the motorcycles from the top of hills on the course. The motorcycle's flight may extend quite some distance to landing. The racers concentrate on the takeoff point just before the top of the hill at the break of a concave portion of the hill. The required concentration makes signaling the riders even from the side of the track near the launch point is very difficult. An embodiment of the current invention would utilize lumens buried in the track just beyond the top of a hill with wavy tubes of one or more colors identifying the current operating rules at that location. Upon activation by an enunciator an air pressure means would be applied to the system and the wavy tubes would extend vertically so that they come into the riders field of vision. The air flow/pressure means may include, but not limited to, a fan, a compressor or a pressurized air tank. When the caution or stop condition is cleared a reverse air flow may be used to collapse the wavy tubes or even retract them into the buried lumen. The wavy tubes would be easily knocked aside and present little hazard to the riders and even include a low strength tear-away section near the buried lumen in case of entanglement with a motorcycle.

I claim:

1. A system for observing and controlling a change of location based event comprising:
a designated region,
a designated event area,
a plurality of event area boundary defining features,
said event area being equal or lesser than said region,
one or more event entity(s),
an event rules set,
said event based on change of location of entity(s),
at least one primary detect transceiver,
a computing system,
at least one event condition enunciator,
said event condition enunciator being in communication with said computing system,
said event condition enunciator having means to signal at least two event condition signals being at least normal and modified,
said entity(s) being able to perceive signals from said event condition enunciator,
said event entity(s) emitting and or reflecting tracking electromagnetic radiation,
said primary detect transceiver having a receptor circuit sensitive to at least one predetermined bandwidth of tracking electromagnetic radiation being emitted and or reflected from said entity(s),
said receptor circuit outputting digital data representing its perceived said tracking electromagnetic radiation,
said primary detect transceiver in communication with said computing system;
said computing system having a data set one representation of said designated region,
said computing system having a data set two representation of said event area including the location of said event area boundary defining features,
said computing system having a data set three representation of said event operating rules having at least two states being normal event operation and modified event operation,
said computing system receiving real time data from said primary detect transceiver(s),
said computing system accumulating said real time data in a time sequential data set five representing frames of data,
said computing system having an event control data transformer which sequentially compares all said data sets one through five,
said event control data transformer comparing the most recent frame of said data set five with a previous frame(s) and calculating the vector of said event entity(s),
said event data transformer outputting and storing time sequential current conditions data set six representing frames of data representing said entity(s) then current location and said event boundary defining features superimposed on said designated region and further indicating at least one event entity's vector and the event operation state,
said computing system outputting signals to said enunciator activating event condition signals being at least normal or modified,
at least one data interface,
said data interface being in communication with said computing system,
said data interface producing human perceivable output and receiving inputs,
said data set six being communicated to said data interface,
said computing system having data set four representing time sequential storage of any commands sent to said computing system,
said event having two or more event entity(s),
each said event entity having an identifying means separately identifiable by said computing system,
and
said computing system accepting commands creating or correcting said event entity(s) identification.

2. The system of claim 1 further comprising:
a unique to each said event entity indicia being displayed on each said event entity being visually perceivable reflective refractive indicia,
said indicial being machine readable,
said primary detect transceiver having at least one circuit sensitive to visual light,
said computer system having a machine vision circuit converting visual signals of said indicia to icons representing each said event entity and their location, and
said icon data being stored within said data set five and outputted in said data set six.

3. The system of claim 1 further comprising:
said event having two or more event entity(s),
said rule set including rules specific to at least two classes of event entities,
said event entities divided into at least two classes,
at least one addressable secondary transceiver attached to each said event entity,
said data set three including representation of rules particular to each said class two and above, and
said event control data transformer producing current conditions data set six including class specific current conditions data.

4. The system of claim 1 further comprising:
said event area being divided into at least two lanes being spaced across the width of said event area,
said event area being further divided into at least two zones being the width of said event area and extending for a predetermined distance, said lanes and zones being represented in said data set two, said event condition enunciator(s) enabled to emit at least a signal for each said lanes, at least one event condition enunciator for each said zone, said event rules including conditions which invoke modified rules for particular lanes, zones or combined areas of lane and zone, and said computing system outputting signals to said enunciators activating event condition signals being at least normal or modified for each said lane and/or zone.

5. The system of claim 1 further comprising:

two or more classes of said event entity(s), said event operating rules having rules specific to each said class and/or individual event entities, at least one secondary transceiver attached to each said event entity, each said secondary transceiver being individually addressable by said computer system, each said secondary transceiver emitting a unique identifier separately identifiable by said computing system, said event data transformer outputting current conditions data set six including any class specific and/or individual event entities modified event operation rule has been invoked, and said computing system outputting signals to each said enunciator which in turn activate event condition signals being at least normal or modified.

6. The system of claim 1 further comprising:

said event entities being mechanically powered event entities, said mechanically powered event entities having an electronic control system, said secondary transceiver in communication with said mechanical event entities electronic control system, and said event condition signals altering the function(s) of said electronic control system.

7. The system of claim 1 further comprising:

at least one said event entities being digital remote event entities in communication with said computer system whose participation in said event is by way of their representation on said event region, and said digital remote entities receiving output from said data set six.

8. The system of claim 1 further comprising:

at least one said event entities being digital remote event entities in communication with said computer system whose participation in said event is by way of their representation on said event region, said digital remote entities receiving output from said data set six, and said secondary transceiver enabled to transmit the presence of any digital event entities to physical event entities on said event area.

9. The system of claim 1 further comprising:

said event data transformer being enabled to compare individual event entities, selected group or class of entities performance data from said data set six against other event entities, selected group or class of entities performance data and output that comparison as data set seven, and further enabled to similarly compare historic data and from other event areas.

10. The system of claim 1 further comprising;

said change of location based event is supercross, said event entity(s) are motorcycles adapted to carry riders, said designated event area includes hills, at least one event condition enunciator comprising, at least one lumen system buried under the surface of said designated event area just past, in the direction of the event path, a hill summit, said lumen system in communication with an air flow/pressure means, said lumen system having at least one air exit connector(s) being oriented vertically with its distal end being flush with or below said designated event area surface and within the width of said designated event area, a wavy tube for each said air exit connector made of collapsible material having a proximal end, length and distal end, said proximal end including a region of lower shear strength material, said wavy tube(s) connected to each said air exit connector via their said proximal end, said wavy tube(s) being a color companionate with an event condition defined by said event rule set, and upon activation said air flow/pressure means causing said wavy tube to extend vertically.

* * * * *